(12) United States Patent
Ravilisetty (10) Patent No.: US 6,830,706 B2
(45) Date of Patent: Dec. 14, 2004

(54) STABLE BLUE PHOSPHOR FOR PLASMA DISPLAY PANEL APPLICATIONS

(75) Inventor: Padmanabha Rao Ravilisetty, Highland, NY (US)

(73) Assignee: Matsushita Electric Industrial Co., LTD., Osaka (JP)

(*) Notice: Subject to any disclaimer, the term of this patent is extended or adjusted under 35 U.S.C. 154(b) by 0 days.

(21) Appl. No.: 10/300,983

(22) Filed: Nov. 21, 2002

(65) Prior Publication Data

US 2004/0099844 A1 May 27, 2004

(51) Int. Cl.$^7$ ............ C09K 11/61; C09K 11/64
(52) U.S. Cl. ............ 252/301.4 R; 252/301.4 H
(58) Field of Search .......... 252/301.4 R, 301.4 H (56) References Cited

U.S. PATENT DOCUMENTS

| | | | |
|---|---|---|---|
| 3,294,699 A | 12/1966 | Lange | 252/301.4 |
| 4,110,660 A | 8/1978 | Wolfe | 313/486 |
| 4,161,457 A * | 7/1979 | Takahashi et al. | 252/301.4 R |
| 4,249,108 A | 2/1981 | Wolfe | 313/486 |
| 4,590,405 A | 5/1986 | Hoeks et al. | 313/486 |
| 5,611,959 A | 3/1997 | Kijima et al. | 252/301.4 |
| 5,879,586 A * | 3/1999 | Kitamura et al. | 252/301.4 R |
| 5,989,454 A | 11/1999 | Rao | 252/301.4 |
| 6,096,243 A * | 8/2000 | Oshio et al. | 252/301.4 R |
| 6,187,225 B1 | 2/2001 | Rao | 252/301.4 |

FOREIGN PATENT DOCUMENTS

| | | | |
|---|---|---|---|
| EP | 0418902 A2 | 3/1991 | H01J/61/44 |
| JP | 08115673 A | 5/1996 | H01J/17/04 |

* cited by examiner

Primary Examiner—C. Melissa Koslow
(74) Attorney, Agent, or Firm—Ohlandt, Greeley, Ruggiero & Perle, LLP

(57) ABSTRACT

Small particle divalent europium activated alkaline earth halide aluminate phosphors are produced by thermal decomposition of respective oxides, carbonates and nitrates in presence of activated charcoal carbon by solid-state reaction. The phosphor of the present invention has the empirical formula:

$$(AE_{1-x}MgEu_x).(AH)y.Al_{10}O_{17}$$

wherein AE is an alkaline earth metal, such as Ba, Sr and Ca; wherein AH is an alkali metal halide wherein the halide is selected from the group consisting of: Cl and F; and wherein $0.01 \leq x \leq 0.1$ and $0 \leq y \leq 0.1$.

39 Claims, 8 Drawing Sheets

STABLE BLUE PHOSPHOR FOR PLASMA DISPLAY PANEL APPLICATIONS

BACKGROUND OF THE INVENTION

1. Field of the Invention

The present invention relates to the development and synthesis of divalent europium activated alkaline earth halide aluminate phosphor particles having a uniform particle size distribution (0.5–5 μm) and a method of forming such particles. More particularly, the present invention relates to the formation of such particles from respective oxides, carbonates, and nitrates in presence of activated charcoal. The phosphor of present invention exhibits improved stability and longer life when used in a plasma display panel.

2. Description of the Prior Art

Divalent europium ($Eu^{2+}$) activated barium magnesium aluminate (BAM) phosphor, is currently used in plasma display panels (PDP) as a blue emitting component. When compared with other phosphors used for red and green, BAM phosphor exhibits lower life or less stability when exposed to vacuum ultraviolet (VUV) flux in a PDP. The maximum wavelength from blue phosphor also shifts towards green during the various process steps in display manufacturing. This shift is called a "green shift".

U.S. Pat. Nos. 5,989,454 and 6,187,225 describe the continued efforts that are being made to improve the existing BAM ($BaMgAl_{10}O_{17}:Eu^{2+}$) phosphors and develop new phosphors such as $LaPO_4:Tm^{3+}$ to address this problem and satisfy other requirements.

U.S. Pat. No. 3,294,699 discloses the invention of BAM as a blue phosphor. According to U.S. Pat. No. 4,110,660, the blend containing $BaF_2$, LiF, $Al(OH)_3$ and $Eu_2O_3$ is fired in a $H_2$ atmosphere in the temperature range of 1400° C.–1650° C. for a period of 3 to 6 hours to obtain blue emitting divalent europium activated barium-lithium aluminate phosphor, which can be used in xerography lamps.

In U.S. Pat. No. 4,161,457, Koichi Takahashi et al. have proposed a BAM phosphor as a high radiation blue emitting phosphor under excitation by vacuum ultraviolet rays having a wavelength shorter than 200 nm. This BAM was prepared by calcinating respective metal salts, such as, carbonates, nitrates, sulfates and halides, at temperatures in the range 1200° C.–1600° C. in two different firing cycles.

U.S. Pat. No. 4,249,108 describes a multi-phase structured $Eu^{2+}$ activated La, Mg aluminate phosphor, which exhibited an improved brightness over prior art single-phase compositions. Starting materials ($La_2O_3$, MgO, $Al(OH)_3$ and $Eu_2O_3$) were fired at 1500° C.–1650° C. for 1–5 hours in a reducing atmosphere (75 vol. % $H_2$, 25 vol. % of $N_2$). Other related art also reveals that Ba (up to 25%) can be replaced by Sr (see, for example, U.S. Pat. No. 4,590,405).

In U.S. Pat. No. 5,611,959, Kijima et al. describe the synthesis of an aluminate phosphor including (a) at least one element selected from the group consisting of Ba, Sr and Ca, (b) Eu, (c) Mg and/or Zn, (d) optionally Mn and (e) Al, obtained by firing the respective oxides and/or hydroxides in a reducing atmosphere at a temperature of from 1200° C.–1700° C. over a period of 2–40 hours.

A method of producing BAM without any fluoride compound (flux) in the starting ingredients was described in U.S. Pat. No. 5,879,586. According to this invention, the diameter (1–20 μm) and the shape of the particles can be controlled by firing the samples in a reducing atmosphere at higher temperatures (1600° C.–2000° C.).

U.S. Pat. Nos. 5,989,454 and 6,187,225 B1 describe blue emitting phosphors.

European Patent No. 0 418 902 A2 describes the role of alkaline earth and zinc in europium activated BAM in three component phosphor blends in controlling fluorescent lamp performance.

According to Japanese Patent (8115673), $BaMgAl_{10}O_{17}:Eu^{2+}$ has better time-wise durability when compared with traditional $BaMgAl_{14}O_{23}:Eu^{2+}$. This particular phosphor has been synthesized by calcinating a barium compound, such as, BaO, $Ba(OH)_2$, $BaCO_3$, etc., an europium compound, such as, $Eu_2O_3$, $EuF_3$, etc., a magnesium compound, such as, MgO, $Mg(OH)_3$, $Mg(CO_3)_4 \cdot Mg(OH)_2 \cdot 5H_2O$, etc., an aluminum compound, such as, $Al_2O_3$, $Al(OH)_3$, etc., and a flux, such as, fluorides of Ba, Al or Mg. The calcinating is carried out at least once for 2–40 hours at 1200–1700° C. in a reducing atmosphere in the presence of steam.

In WO 99/34389, Zachau has suggested the use of manganese in BAM as a co-activator along with europium to obtain better stability and maintenance of BAM in plasma display applications.

The main application area of large area plasma displays is High Definition Television (HDTV) and high information content presentation. HDTV and other similar types of display devices require phosphors with high resolution and high brightness for high performance. This can be achieved only with thin phosphor screens that have small phosphor particles in a close rib structure or closed cell structure. Screens with small particles exhibit higher packing density and also need reduced binder content.

Stability is another concern in selecting a phosphor. The degradation of phosphor should not be more than 10% before 10,000 hours of operation of a plasma display panel.

The three phosphors, i.e., red, green and blue, that are currently used in PDP's, do not exhibit the same life, stability and particle morphology. Thus, the blue phosphor degrades very fast when compared with the green and red phosphors. During the display process, the color point, i.e., the color coordinates, of the blue phosphor (BAM) shifts towards green. This result compromises the performance of the display.

In view of these problems, our efforts have been directed to improvement of the existing phosphors (BAM) and the development new phosphors.

SUMMARY OF THE INVENTION

Accordingly, it is an objective of the present invention to provide development and a method of preparation of divalent europium activated alkaline earth halide aluminate phosphor having the empirical formula:

$$(AE_{1-x}MgEu_x) \cdot (AH)y \cdot Al_{10}O_{17}$$

wherein AE is an alkaline earth metal selected from the group consisting of: Ba, Sr and Ca;

wherein AH is an alkali metal halide or ammonium halide wherein the halide is Cl or F; and wherein $0.01 \leq x \leq 0.1$ and $0 \leq y \leq 0.1$.

The present invention provides a method of producing a blue color emitting divalent europium activated alkaline earth halide aluminate phosphor having the empirical formula:

$$(AE_{1-x}MgEu_x) \cdot (AH)y \cdot Al_{10}O_{17}$$

wherein AE is an alkaline earth metal selected from the group consisting of: Ba, Sr and Ca;

wherein AH is an alkali metal halide or ammonium halide wherein the halide is Cl or F; and wherein $0.01 \leq x \leq 0.1$ and $0 \leq y \leq 0.1$.

The method includes the steps of:

heating the chemical mixture including: a source of europium, a source of aluminum, a source of barium or calcium or strontium and a source of magnesium to 850° C.; optionally adding a source of a halide, such as, chloride or fluoride, to the mixture;

heating to 1000° C. to 1600° C. in the presence of air or an activated charcoal carbon; and heating at 1000° C. to 1400° C. in presence of a reducing atmosphere forming gas, i.e., a 5% Hydrogen and 95% Nitrogen mixture, for a period of time sufficient to produce the phosphor.

The phosphors according to the present invention have a band emission in blue region, peaking around 450 nm when excited by 147 or 173 nm radiation from Xenon gas mixture. They have uniform particle size distribution (0.5–5 microns), which is appropriate for thin phosphor screens required for a variety of flat panel display such as plasma display panels and lamp applications. They also exhibit better stability or life when excited with VUV (147 and 173 nm) radiations from Xe discharge in a plasma display than the currently available commercial phosphors used in plasma display panels. The small size phosphor particles provided by the present invention are particularly suitable for use in high-resolution display applications.

BRIEF DESCRIPTION OF THE DRAWINGS

FIGS. 1a through 1d illustrate scanning electron micrographs of $Eu^{2+}$ activated barium magnesium chloro aluminate phosphors prepared from oxides, carbonates and nitrates and various chloride fluxes by a solid state process.

FIGS. 2a through 2d illustrate scanning electron micrographs of $Eu^{2+}$ activated barium magnesium fluoro aluminate phosphors prepared by a solid state process from oxides, carbonates and nitrates and various fluoride fluxes.

DETAILED DESCRIPTION OF THE INVENTION

There are a number of display applications where a blue phosphor with better stability and longer life would significantly improve the display's performance. The blue component is very important, as it improves the color temperature of the display. The life of blue emitting phosphor is short when compared with life of green and red emitting phosphors, particularly in PDPs.

Efforts in the present invention are directed towards improvement of the existing blue emitting phosphor such as $BaMgAl_{10}O_{17}:Eu^{2+}$ phosphor and towards the development of new phosphors, such as, $LaPO_4:Tm^{3+}$. Accordingly, the results of this development effort provide the basis of the present invention.

The present invention provides a method of synthesizing alkaline earth halide aluminate phosphors incorporating $(Eu^{2+})$ ion as an activator. The blue color emitting phosphor of the present invention has the empirical formula:

$$(AE_{1-x}MgEu_x)y.AH.Al_{10}O_{17}$$

wherein AE is an alkaline earth metal selected from the group consisting of: Ba, Sr and Ca;

wherein AH is an alkali metal or ammonium halide wherein the halide is Cl or F; and wherein $0.01 \leq x \leq 0.1$ and $0 = y < 0.1$.

The method includes the steps of:

heating a chemical mixture including: a source of europium, a source of aluminum, a source of barium, calcium or strontium, and a source of magnesium to 850° C.;

adding a source of a halide, which is chlorine or fluorine, to the mixture; and heating to 1000° C. to 1600° C. in presence of air or an activated charcoal carbon;

heating at 1000° C. to 1400° C. in presence of a reducing atmosphere for a period of time sufficient to produce the phosphor.

The steps of heating are preferably carried out for a period of time of about 2 to about 6 hours.

The phosphor exhibits the following luminescence and morphological properties:

relative intensity (AU) at 147 nm or 173 nm excitation from about 67 to about 113 with half width from about 53 to about 55 nm;

color coordinates of x from about 0.154 to about 0.162 and y from about 0.071 to about 0.080; and particle size from about 0.5 microns to about 5.0 microns.

The europium is preferably provided from a source selected from group consisting of: europium nitrate, europium oxide, europium hydroxide, and mixtures thereof.

The alkaline earth metal is preferably provided from a source, such as, an alkaline earth nitrate, alkaline earth carbonate, alkaline earth oxide, alkaline earth hydroxide or mixtures thereof.

The aluminum is provided from an aluminum source, which is either an α-aluminum oxide or γ-aluminum oxide. An aluminum source, which is γ-aluminum oxide, is preferred.

The chlorine is provided from a source, such as, ammonium chloride, lithium chloride, sodium chloride, potassium chloride and mixtures thereof and the fluorine is provided from a source, such as, ammonium fluoride, lithium fluoride, sodium fluoride, potassium fluoride and mixtures thereof.

In one embodiment, the phosphor is formed by thermally decomposing a mixture including a source of each metal in an open atmosphere at a temperature from about 1000° C. to about 1600° C. in air and then at a temperature about 1000° C. to about 1400° C. in a reducing atmosphere.

The reducing atmosphere preferably includes a forming gas, which is preferably a 5% $H_2$ and 95% $N_2$.

In another embodiment, the phosphor is formed by thermally decomposing a mixture including a source of each metal in an open atmosphere at a temperature about 1000° C. to about 1600° C. in presence of activated charcoal carbon; and thereafter at a temperature about 1000° C. to about 1400° C. in a reducing atmosphere.

The alkaline earth metal includes Mg and one of Ba, Ca and Sr. Preferably, the phosphor includes from about 1.9 moles to about 2.0 moles of total alkaline earth metal, i.e., Mg and one of Ba, Ca and Sr, from about 0.01 moles to about 0.1 moles of europium, and about 10.0 moles of aluminum.

The phosphor according to the present invention does not exhibit a green shift in the process of making a plasma display panel.

The formation and morphology of the alkaline earth halide aluminate solid solution is critical and is highly dependent on the reaction temperature and conditions. A flux in the form of various halides improves the morphology the phosphors and also enhances the stability of the phosphor.

X-ray powder diffraction data on samples fired at 1500° C. and refired at 1200° C. ($N_2+H_2$) shows all prominent lines of barium, magnesium aluminate.

The samples fired below 1000° C. show some of the lines corresponding to barium, magnesium aluminate phase. The lines corresponding to barium magnesium aluminate phase are more prominent with increasing firing temperature. Samples fired at and above 1200° C. exhibit all lines related to barium, magnesium aluminate and also indicate the formation of crystalline phase of barium magnesium aluminate.

Because luminescence of a phosphor depends on the shape, size, crystallinity, defects and grain boundaries, the morphology and particle size distribution (PSD) of samples prepared under a variety of conditions were studied.

Referring to FIGS. 1a through 1d, scanning electron micrographs of $Eu^{2+}$ activated barium magnesium chloro aluminate phosphor samples prepared from oxides, carbonates and nitrates and various chloride fluxes by a solid state process are shown.

The emission characteristics of the phosphor are determined on compacted powders at room temperature under VUV excitation (147 nm or 173 nm).

Figure 1A:
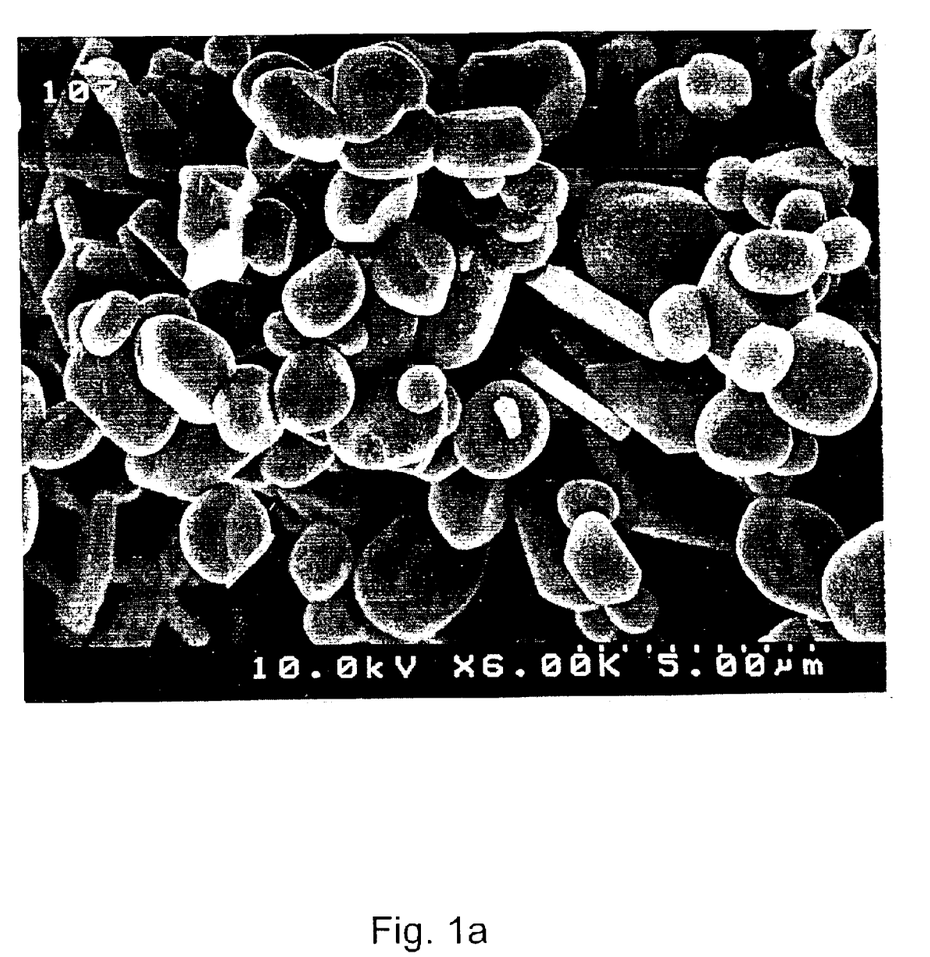
FIG. 1a shows a scanning electron micrograph of the phosphor prepared using a lithium chloride flux.
Figure 1B:
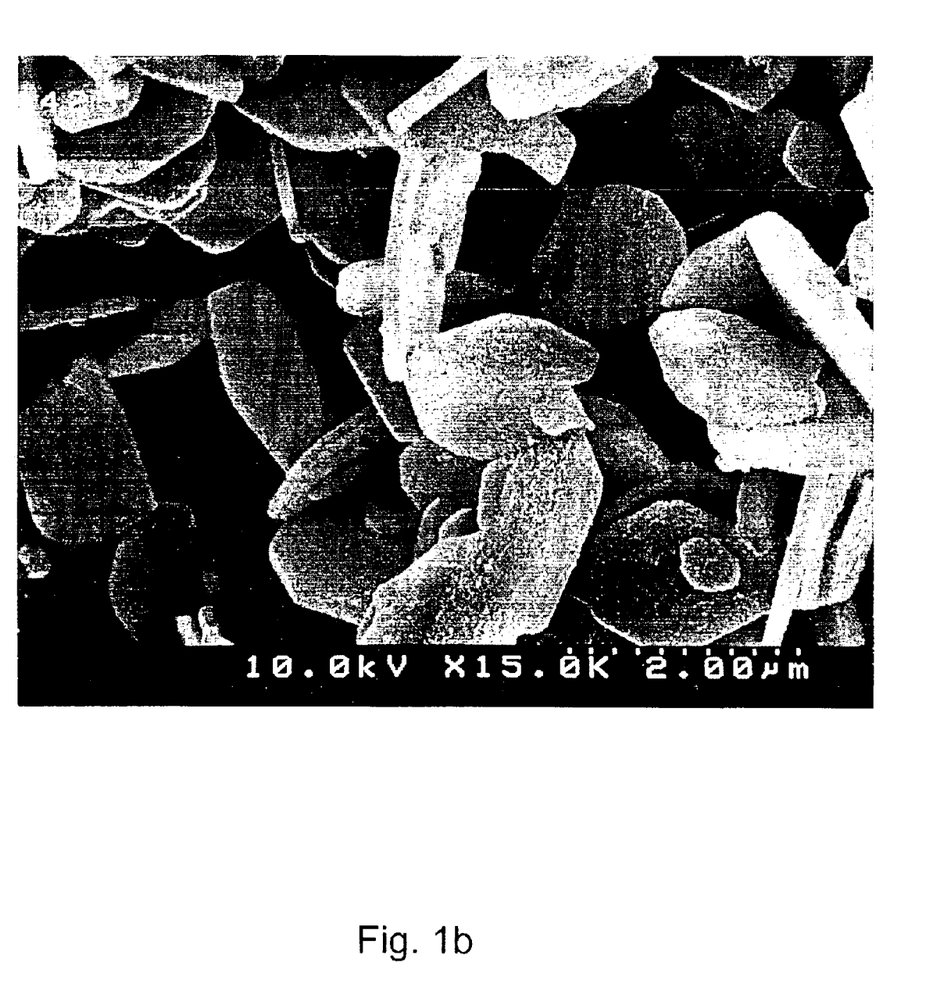
FIG. 1b shows a scanning electron micrograph of the phosphor prepared using a potassium chloride flux.
Figure 1C:
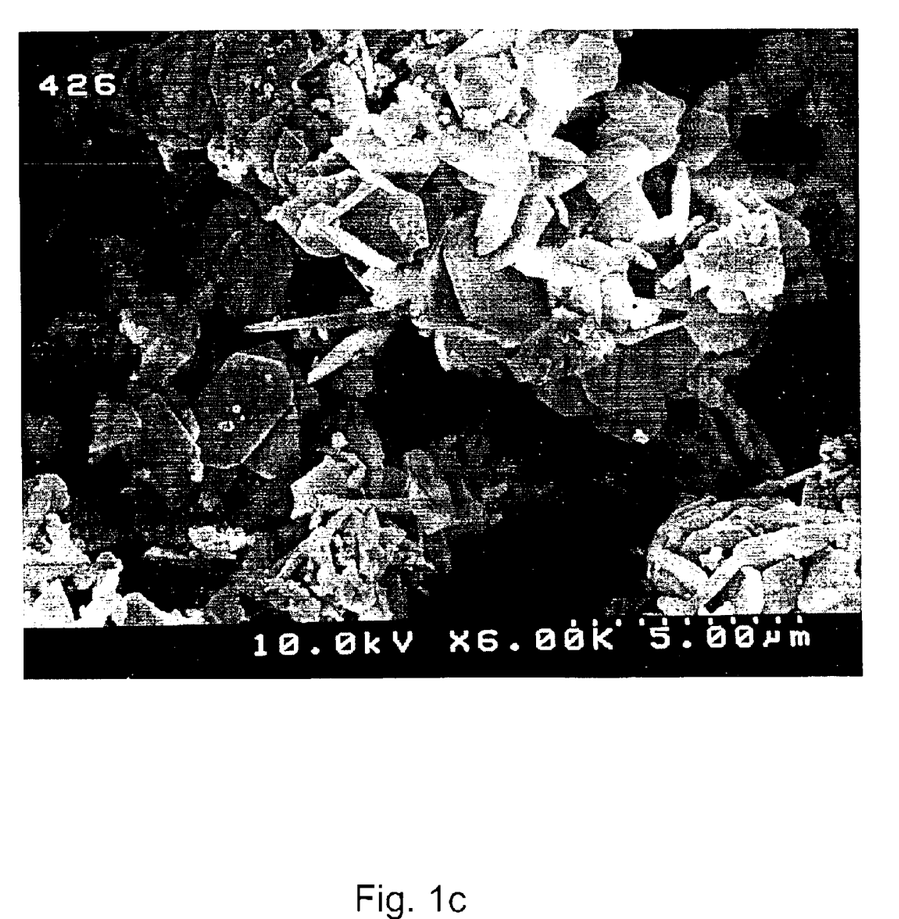
FIG. 1c shows a scanning electron micrograph of the phosphor prepared using a sodium chloride flux.
Figure 1D:
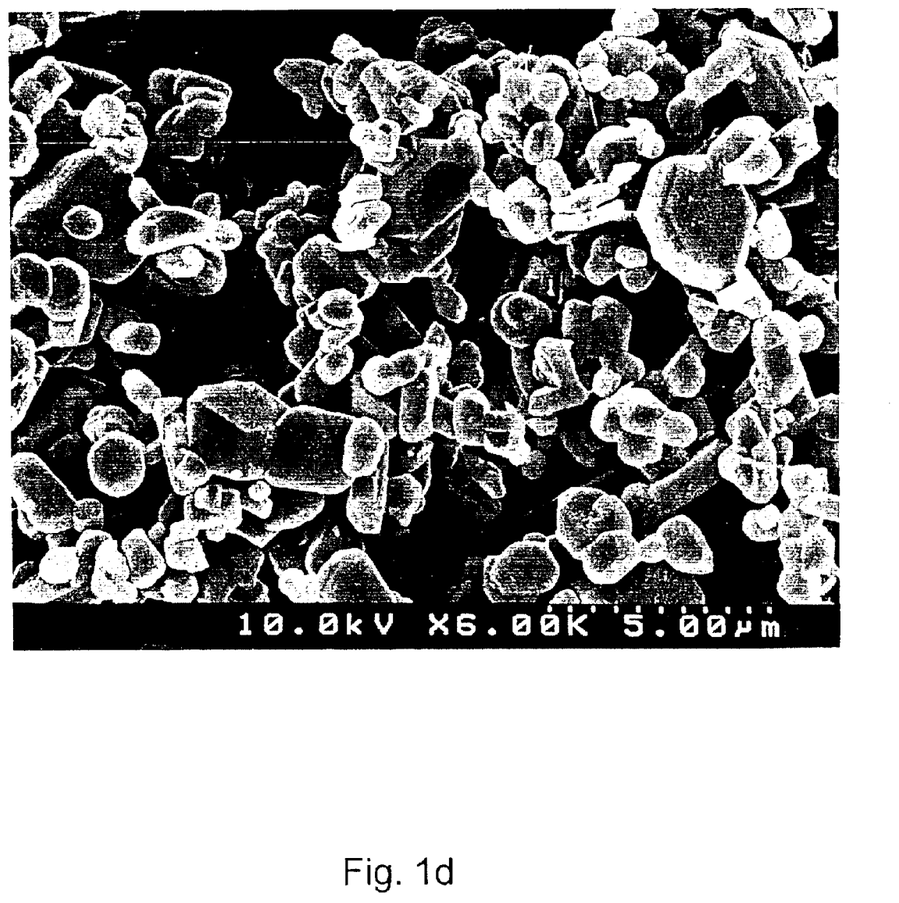
FIG. 1d shows a scanning electron micrograph of the phosphor prepared using an ammonium chloride flux.

FIG. 1a shows a scanning electron micrograph of the phosphor prepared using a lithium chloride flux; FIG. 1b shows a scanning electron micrograph of the phosphor prepared using a potassium chloride flux; FIG. 1c shows a scanning electron micrograph of the phosphor prepared using a sodium chloride flux; and FIG. 1d shows a scanning electron micrograph of the phosphor prepared using an ammonium chloride flux.

Referring to FIGS. 2a through 2d, scanning electron micrographs of $Eu^{2+}$ activated barium magnesium fluoro aluminate phosphors prepared by a solid state process from oxides, carbonates and nitrates and various fluoride fluxes are shown.

The emission characteristics of these phosphors are determined on compacted powders at room temperature under VUV excitation (147 nm or 173 nm).

Figure 2A:
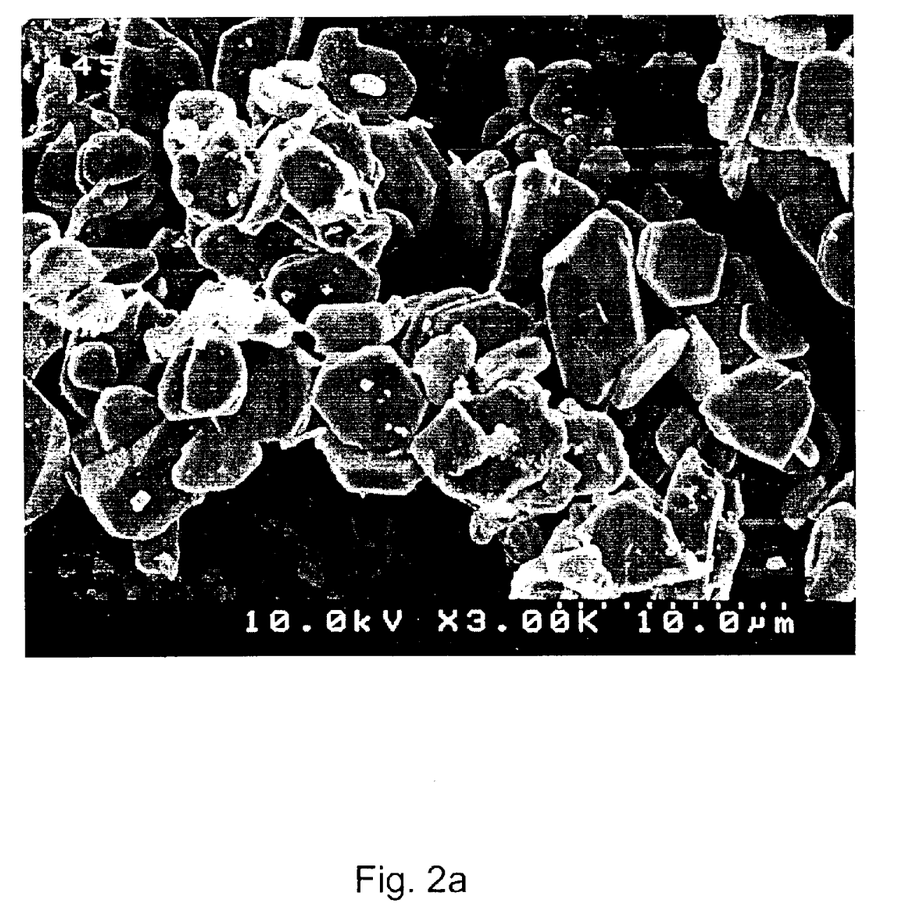
FIG. 2a shows a scanning electron micrograph of the phosphor prepared using a lithium fluoride flux.
Figure 2B:
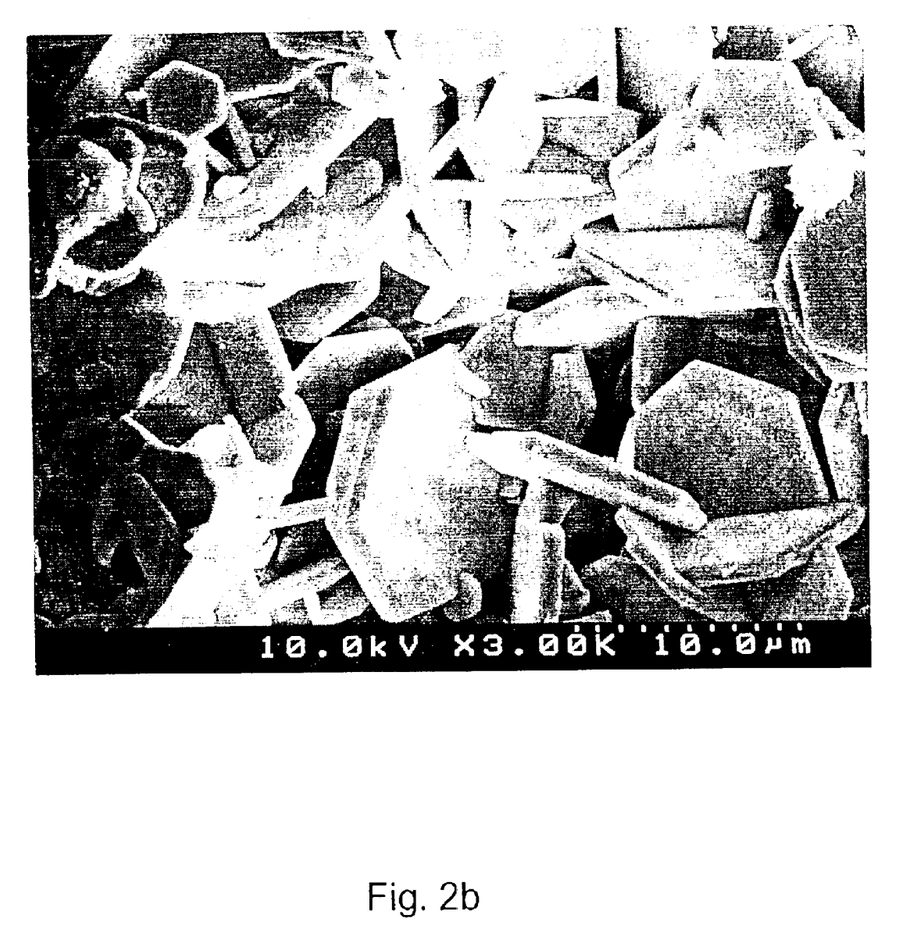
FIG. 2b shows a scanning electron micrograph of the phosphor prepared using a potassium fluoride flux.
Figure 2C:
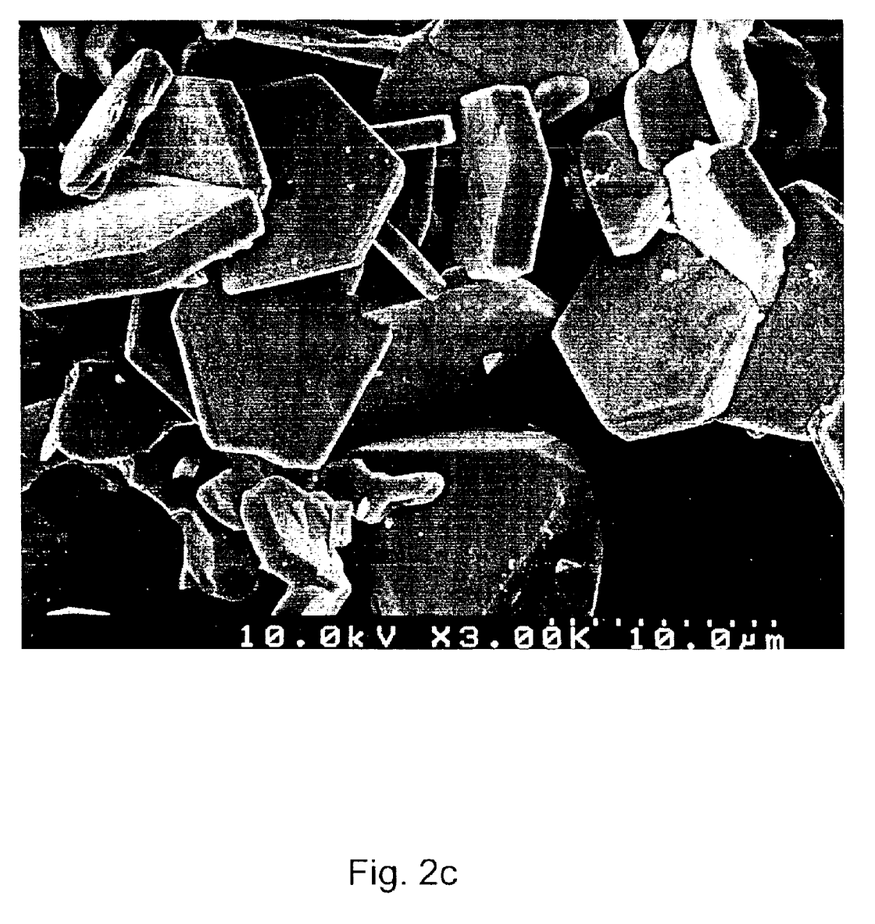
FIG. 2c shows a scanning electron micrograph of the phosphor prepared using a sodium fluoride flux.
Figure 2D:
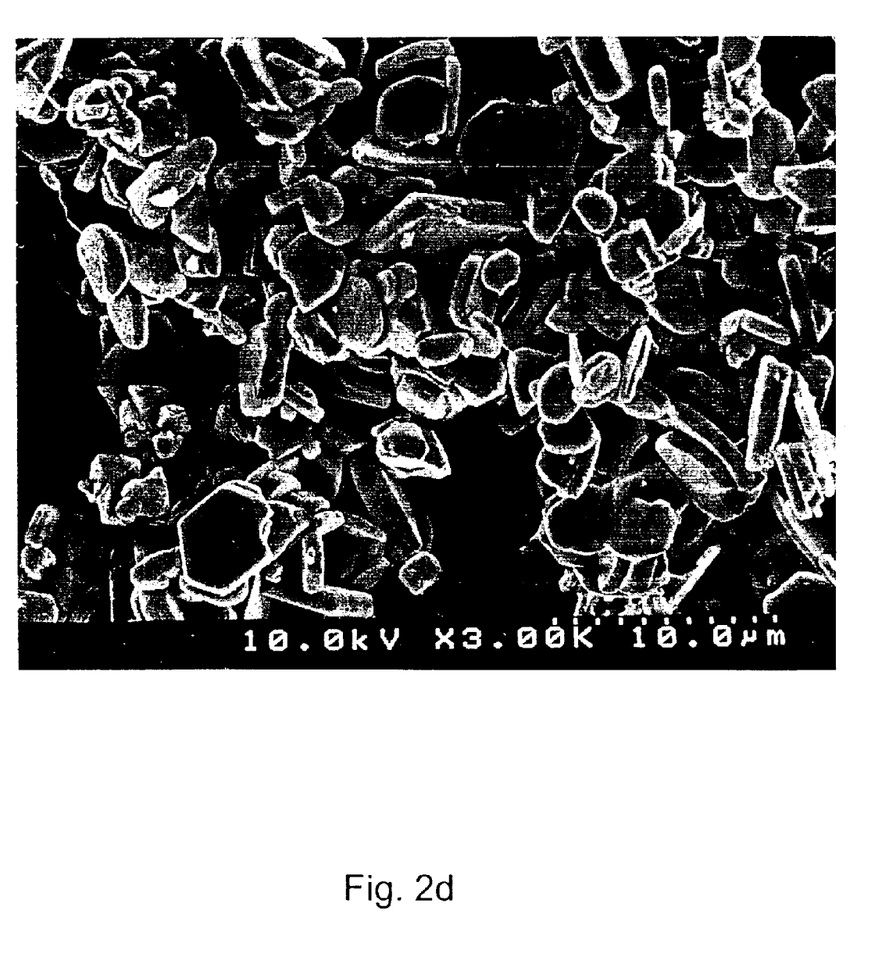
FIG. 2d shows a scanning electron micrograph of the phosphor prepared using an ammonium fluoride flux.

FIG. 2a shows a scanning electron micrograph of the phosphor prepared using a lithium fluoride flux; FIG. 2b shows a scanning electron micrograph of the phosphor prepared using a potassium fluoride flux; FIG. 2c shows a scanning electron micrograph of the phosphor prepared using a sodium fluoride flux; and FIG. 2d shows a scanning electron micrograph of the phosphor prepared using an ammonium fluoride flux.

Life test is carried out on samples screen printed on glass substrates and exposed to 60-Watt Xe plus lamp for about 30 minutes to about 600 minutes, typically for about 60 minutes, in presence of Nitrogen gas.

The phosphors according to the present invention have a band emission in blue region, peaking around 450 nm when excited by 147 or 173 nm radiation from Xenon gas mixture. They have uniform particle size distribution (0.5–5 microns), which is appropriate for thin phosphor screens required for a variety of flat panel display such as plasma display panels and lamp applications.

The phosphors according to the present invention also exhibit better stability or life when excited with VUV (147 and 173 nm) radiations from Xe discharge in a plasma display than the currently available commercial phosphors used in plasma display panels.

The present invention improves the stability and imparts longer life to phosphor particles as required for flat panel display (FPD) applications, including plasma display panel (PDP) and lamp applications.

Further details of this invention will be described with reference in the following examples.

EXAMPLE 1

10.2 grams of α-aluminum oxide (99.98%, <1 micron APS powder), 1.92 grams of barium carbonate, 1.2 grams of magnesium carbonate and 0.544 grams of europium nitrate are mixed and transferred to high-grade alumina crucible and fired at 850° C. for 2 hours (rate of heating is 2°/min.). 0.0317 grams of lithium chloride is added to the fired mass and ground thoroughly and then heated 1000 to 1600° C. for 2 to 6 hours, with the same rate of heating, in presence of air, in a box furnace.

Samples are re-fired in a forming gas (5% $H_2$+95% $N_2$) at 1000 to 1400° C. for 2 to 4 hours in a tube furnace. The samples are left in the furnace with the gas on until they cool down to room temperature. After cooling, these fine phosphor powders are subjected to ultrasonic agitation in water. Ultrasonic treatment helps to break the clusters into very small particles. After washing with a diluted nitric acid and then with water, powders are dried at 100° C. for 6 hours. Depending upon the required amounts, this can be scaled up.

The emission characteristics of the above phosphor were recorded at room temperature exciting with excitation VUV. The green shift and % of degradation are given in Table 1.

EXAMPLE 2–5

Same as in Example 1 except LiCl is replaced with KCl (0.0558 grams) or NaCl (0.0437 grams) or $NH_4Cl$ (0.040 grams) or without any chloride.

EXAMPLE 6

Same as Example 1 except α-alumina powder is replaced by γ-alumina (99.5%, 37 nm APS powder).

EXAMPLE 7–10

Same as Examples 2–5 except γ-alumina powder is replaced by γ-alumina (99.5%, 37 nm APS powder).

EXAMPLE 11

10.2 grams of α-aluminum oxide (99.98%, <1 micron APS powder), 1.92 grams of barium carbonate, 1.2 grams of magnesium carbonate and 0.544 grams of europium nitrate are mixed and transferred to high-grade alumina crucible and fired at 850° C. for 2 hours (rate of heating is 2°/min.). Then, a 0.0317 gram of lithium chloride is added to the fired mass and ground thoroughly and then made into a loose pellet, buried in activated charcoal carbon and inserted in a bigger crucible and filled the crucible with activated charcoal carbon heated 1000 to 1600° C. for 2 to 6 hours, with the same rate of heating, in a tight box furnace. Samples are cool down to room temperature without disturbing the carbon in the crucible.

Heat-treated pellet are crushed to powder and re-fired in a forming gas (5% $H_2$+95% $N_2$) at 1000 to 1400° C. for 2 to 4 hours in a tube furnace. The samples are left in the furnace with gas on until they cool down to room temperature. The washing procedure is same as described in Example 1

EXAMPLE 12–15

Same as in Example 11 except LiCl is replaced with KCl (0.0558 grams) or NaCl (0.0437 grams) or $NH_4Cl$ (0.040 grams) or without any chloride.

EXAMPLE 16

Same as Example 11 except α-alumina powder is replaced by γ-alumina (99.5%, 37 nm APS powder).

EXAMPLE 17–20

Same as Examples 12–15 except α-alumina powder is replaced by γ-alumina (99.5%, 37 nm APS powder).

EXAMPLES 21–24

Same as in Example 11 except LiCl is replaced with LiF (0.02 grams) or NaF (0.031 grams) or $NH_4F$ (0.030 grams) or KF (0.043 grams).

EXAMPLES 25–28

Same as Examples 21–24 except α-alumina powder is replaced by γ-alumina (99.5%, 37 nm APS powder).

In addition, the phosphors prepared from γ-alumina according to the present invention exhibit reduced degradation with time during the operation of a plasma display panel by an amount of about 30%.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A divalent europium activated alkaline earth halide aluminate phosphor having the empirical formula:

$(AE_{1-x}MgEu_x).(AH)y.Al_{10}O_{17}$ wherein AE is an alkaline earth metal selected from the group consisting of: Ba, Sr and Ca;

wherein AH is an alkali metal or ammonium halide wherein said halide is selected from the group consisting of: Cl and F; and wherein $0.01 \leq x \leq 0.1$ and $0 < y \leq 0.1$.

2. The phosphor of claim 1, wherein said phosphor exhibits the following luminescence and morphological properties:

relative intensity (AU) at 147 nm or 173 nm excitation from about 67 to about 113 with half width from about 53 to about 55 nm;

color coordinates of x from about 0.154 to about 0.162 and y from about 0.071 to about 0.080; and particle size from about 0.5 microns to about 5.0 microns.

3. The phosphor of claim 1, wherein said phosphor is formed by thermally decomposing a mixture comprising a source of each metal in an open atmosphere at a temperature

TABLE 1

Luminescence Characteristics of $Eu^{2+}$ activated Barium Magnesium chloro Aluminate Phosphors prepared at various conditions.

| Example | Type of Alumina | Source of Chlorine | Firing Condition | Relative Brightness | Green Shift | Degradation (%) |
|---|---|---|---|---|---|---|
| 1 | α | LiCl | Air | 79.0 | Yes | 37 |
| 2 | α | KCl | Air | 71.0 | Yes | 38 |
| 3 | α | NaCl | Air | 77.4 | Yes | 36 |
| 4 | α | $NH_4Cl$ | Air | 96.7 | Yes | 31 |
| 5 | α | — | Air | 100.0 | Yes | 46 |
| 6 | γ | LiCl | Air | 80.6 | No | 30 |
| 7 | γ | KCl | Air | 67.8 | No | 25 |
| 8 | γ | NaCl | Air | 75.8 | No | 28 |
| 9 | γ | $NH_4Cl$ | Air | 98.0 | No | 24 |
| 10 | γ | — | Air | 93.5 | No | 35 |
| 11 | α | LiCl | Carbon | 92.4 | Yes | 25 |
| 12 | α | KCl | Carbon | 90.3 | Yes | 26 |
| 13 | α | NaCl | Carbon | 96.7 | Yes | 22 |
| 14 | α | $NH_4Cl$ | Carbon | 99.1 | Yes | 16 |
| 15 | α | — | Carbon | 106.2 | Yes | 20 |
| 16 | γ | LiCl | Carbon | 99.6 | No | 20 |
| 17 | γ | KCl | Carbon | 113.0 | No | 16 |
| 18 | γ | NaCl | Carbon | 114.1 | No | 14 |
| 19 | γ | NH4Cl | Carbon | 113.0 | No | 12 |
| 20 | γ | — | Carbon | 103.1 | No | 16 |
| 21 | α | LiF | Carbon | 99.6 | Yes | 19 |
| 22 | α | KF | Carbon | 96.8 | Yes | 21 |
| 23 | α | NaF | Carbon | 99.1 | Yes | 24 |
| 24 | α | $NH_4F$ | Carbon | 100.7 | Yes | 18 |
| 25 | γ | LiF | Carbon | 112.6 | No | 13 |
| 26 | γ | KF | Carbon | 101.5 | No | 20 |
| 27 | γ | NaF | Carbon | 102.1 | No | 18 |
| 28 | γ | $NH_4F$ | Carbon | 109.7 | No | 15 |

As the data of Table 1 demonstrates, samples with γ-alumina fired in presence of carbon exhibit higher level of brightness, better stability with no green shift.

from about 1000° C. to about 1600° C. in air and then at a temperature about 1000° C. to about 1400° C. in a reducing atmosphere.

4. The phosphor of claim 3, wherein said reducing atmosphere comprises forming gas.

5. The phosphor of claim 1, wherein said phosphor is formed by thermally decomposing a mixture comprising a source of each metal in an open atmosphere at a temperature about 1000° C. to about 1600° C. in presence of activated charcoal carbon; and thereafter at a temperature about 1000° C. to about 1400° C. in a reducing atmosphere.

6. The phosphor of claim 5, wherein said reducing atmosphere comprises forming gas.

7. The phosphor of claim 1, wherein said phosphor has a particle size from about 0.5 to about 5.0 microns.

8. The phosphor of claim 1, wherein said phosphor does not exhibit a green shift in the process of making a plasma display panel.

9. The phosphor of claim 1, wherein said phosphor exhibits reduced degradation with time during the operation of a plasma display panel by about 30%.

10. A method of producing a blue color emitting divalent europium activated alkaline earth halide aluminate phosphor having the empirical formula:

$$(AE_{1-x}MgEu_x).(AH)y.Al_{10}O_{17}$$

wherein AE is an alkaline earth metal selected from the group consisting of: Ba, Sr and Ca;
wherein AH is an alkali metal or ammonium halide wherein said halide is selected from the group consisting of: Cl and F; and
wherein $0.01 \leq x \leq 0.1$ and $0 \leq y \leq 0.1$;
wherein said method comprises the steps of:
heating the chemical mixture comprising: a source of europium, a source of aluminum, a source of barium, calcium or strontium, and a source of magnesium to 850° C.; optionally
adding a source of a halide selected from the group consisting of: chloride and fluoride to the mixture;
heating to 1000° C. to 1600° C. in presence of air or an activated charcoal carbon; and
heating at 1000° C. to 1400° C. in presence of a reducing atmosphere for a period of time sufficient to produce said phosphor.

11. The method of claim 10, wherein said step of heating to 850° C. is for a period of time of about 2 to about 6 hours.

12. The method of claim 10, wherein said reducing atmosphere comprises forming gas.

13. The method of claim 10, wherein said phosphor exhibits the following luminescence and morphological properties:
relative intensity (AU) at 147 nm or 173 nm excitation from about 67 to about 113 with half width from about 53 to about 55 nm;
color coordinates of x from about 0.154 to about 0.162 and y from about 0.071 to about 0.080; and
particle size from about 0.5 microns to about 5.0 microns.

14. The method of claim 10, wherein said europium is provided from a source selected from group consisting of: europium nitrate, europium oxide, europium hydroxide, and mixtures thereof.

15. The method of claim 10, wherein said alkaline earth metal is provided from a source selected from the group consisting of: alkaline earth nitrate, alkaline earth carbonate, alkaline earth oxide, alkaline earth hydroxide and mixtures thereof.

16. The method of claim 10, wherein said aluminum is provided from a source selected from the group consisting of: α-aluminum oxide.

17. The method of claim 10, wherein said aluminum is provided from a source which is γ-aluminum oxide.

18. The method of claim 10, wherein said chloride is provided from a source selected from the group consisting of: ammonium chloride, lithium chloride, sodium chloride, potassium chloride and mixtures thereof.

19. The method of claim 10, wherein said fluoride is provided from a source selected from the group consisting of: ammonium fluoride, lithium fluoride, sodium fluoride, potassium fluoride and mixtures thereof.

20. The method of claim 16, wherein said phosphor is formed by thermally decomposing a mixture comprising a source of each metal in an open atmosphere at a temperature from about 1000° C. to about 1600° C. in air and then at a temperature about 1000° C. to about 1400° C. in a reducing atmosphere.

21. The phosphor of claim 20, wherein said reducing atmosphere comprises forming gas.

22. The method of claim 17, wherein said phosphor is formed by thermally decomposing a mixture comprising a source of each metal in an open atmosphere at a temperature from about 1000° C. to about 1600° C. in air; and thereafter at a temperature about 1000° C. to about 1400° C. in a reducing atmosphere.

23. The phosphor of claim 22, wherein said reducing atmosphere comprises forming gas.

24. The method of claim 16, wherein said phosphor is formed by thermally decomposing a mixture comprising a source of each metal in an open atmosphere at a temperature about 1000° C. to about 1800° C. in presence of activated charcoal carbon; and thereafter at a temperature about 1000° C. to about 1400° C. in a reducing atmosphere.

25. The phosphor of claim 24, wherein said reducing atmosphere comprises forming gas.

26. The method of claim 17, wherein said phosphor is formed by thermally decomposing a mixture comprising a source of each metal in an open atmosphere at a temperature about 1000° C. to about 1600° C. in presence of activated charcoal carbon; and thereafter at a temperature about 1000° C. to about 4000° C. in a reducing atmosphere.

27. The phosphor of claim 26, wherein said reducing atmosphere comprises forming gas.

28. The method of claim 10, wherein said phosphor has a particle size from about 0.5 to about 5.0 microns.

29. The phosphor of claim 10, wherein said phosphor comprises from about 1.9 moles to about 2.1 moles of alkaline earth metal, from about 0.01 moles to about 0.1 moles of europium, and about 10.0 moles of aluminum.

30. The phosphor of claim 10, wherein said phosphor does not exhibit a green shift in the process of making a plasma display panel.

31. The phosphor of claim 10, wherein said phosphor exhibits reduced degradation with time during the operation of a plasma display panel by an amount of about 30%.

32. A divalent europium activated alkaline earth aluminate phosphor having the empirical formula:

$$(AE_{1-x}MgEu_x).Al_{10}O_{17}$$

wherein AE is an alkaline earth metal selected from the group consisting of: Ba, Sr and Ca;
wherein $0.01 \leq x \leq 0.1$; and
wherein said phosphor exhibits the following luminescence and morphological properties:

relative intensity (AU) at 147 nm or 173 nm excitation from about 67 to about 113 with half width from about 53 to about 55 nm;

color coordinates of x from about 0.154 to about 0.162 and y from about 0.071 to about 0.080; and particle size from about 0.5 microns to about 5.0 microns.

33. The phosphor of claim 32, wherein said phosphor is formed by thermally decomposing a mixture comprising a source of each metal in an open atmosphere at a temperature from about 1000° C. to about 1600° C. in air and then at a temperature about 1000° C. to about 1400° C. in a reducing atmosphere.

34. The phosphor of claim 33, wherein said reducing atmosphere comprises forming gas.

35. The phosphor of claim 32, wherein said phosphor is formed by thermally decomposing a mixture comprising a source of each metal in an open atmosphere at a temperature about 1000° C. to about 1600° C. in presence of activated charcoal carbon; and thereafter at a temperature about 1000° C. to about 1400° C. in a reducing atmosphere.

36. The phosphor of claim 35, wherein said reducing atmosphere comprises forming gas.

37. The phosphor of claim 32, wherein said phosphor has a particle size from about 0.5 to about 5.0 microns.

38. The phosphor of claim 32, wherein said phosphor does not exhibit a green shift in the process of making a plasma display panel.

39. The phosphor of claim 32, wherein said phosphor exhibits reduced degradation with time during the operation of a plasma display panel by about 30%.

* * * * *